US006230231B1

(12) United States Patent
DeLong et al.

(10) Patent No.: US 6,230,231 B1
(45) Date of Patent: May 8, 2001

(54) HASH EQUATION FOR MAC ADDRESSES THAT SUPPORTS CACHE ENTRY TAGGING AND VIRTUAL ADDRESS TABLES

(75) Inventors: Kenneth J. DeLong, Hollis, NH (US); David S. Miller, Framingham, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/044,490

(22) Filed: Mar. 19, 1998

(51) Int. Cl.[7] .................................................. G06F 12/00
(52) U.S. Cl. .............................. 711/3; 711/200; 711/216
(58) Field of Search ................................. 711/3, 200, 216

(56) References Cited

U.S. PATENT DOCUMENTS

| | | | |
|---|---|---|---|
| 4,215,402 | * 7/1980 | Mitchell et al. | 711/216 |
| 5,633,858 | * 5/1997 | Chang et al. | 711/216 |
| 5,923,660 | * 7/1999 | Shemla et al. | 370/401 |

OTHER PUBLICATIONS

Kilchenmann, S. Re: Bytearray to integer. [Online] news://de.comp.lang.java, Dec. 17, 1997.*

*DEC–TR593, A Comparison of Hashing Schemes for Address Lookup in Computer Networks,* by: Raj Jain, Digital Equipment Corporation, Littleton, MA 01460, dated Feb. 1989.

\* cited by examiner

*Primary Examiner*—Do Yoo
*Assistant Examiner*—Yamir Encarnación
(74) *Attorney, Agent, or Firm*—Weingarten, Schurgin, Gagnebin & Hayes LLP

(57) ABSTRACT

A cache line index for an address cache entry is calculated by organizing an address such as a Media Access Control ("MAC") address into a plurality of intermediate elements, barrel shifting the bits of at least one of the intermediate elements in accordance with predetermined criteria, and folding the intermediate address elements together with an exclusive-OR function. A Virtual Local Area Network ("VLAN") index may also be included in cache line index calculation. The VLAN index enables segmentation of the cache into virtual tables. The tag portion of the cache entry includes a subset of the complete set of intermediate elements. The intermediate elements in the cache entry can be employed in conjunction with the cache line index to recover the original MAC address. Hence, the size of the tag portion of the address cache entry is reduced relative to the full MAC address without a reduction in the information content of the entry.

16 Claims, 4 Drawing Sheets

HASH EQUATION FOR MAC ADDRESSES THAT SUPPORTS CACHE ENTRY TAGGING AND VIRTUAL ADDRESS TABLES

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates generally to network switches, and more particularly to storage and recovery of address information in an address cache of a network switch.

Network switches commonly employ an address cache to facilitate the flow of data units from a source device to a destination device in a communications network. The address cache contains entries that indicate address information for various devices in the network such as computers and printers. In a technique known as "forwarding," the switch employs the address information to determine which port or ports to employ for transmission of a received data unit toward the destination device. Without the benefit of the address information the switch needs to transmit the data unit via every port in the switch in accordance with a technique known as "flooding" in order to assure that the data unit may be received by the destination device.

Caching requires a hash function that maps a search key to a cache line index. The cache line index is used to access the cache to perform a comparison of the search key to the cache tag. If a match is found, the cache data associated with the cache entry is returned. In a network switch, the search key is commonly a Media Access Control ("MAC") address. The cache tag is compared against the appropriate fields of the MAC address and if a match is found, the associated cache data is used to forward the data frame. The combination of cache line index and cache tag limit the amount of storage required for the data structure because the full 48 bit MAC address does not need to be stored in every cache entry.

Bit selection is one of the simplest forms of hash function. With bit selection, some number of bits (e.g., low order 16 bits of MAC address) are used as the cache line index and the remaining bits (e.g., high order 32 bits) are stored in the cache entry as the cache tag. A matching cache entry is found when the cache tag is equal to the corresponding bits of the MAC address for which the search is being performed.

In network switch applications the key space is the set of all MAC addresses and the search key space is the subset of MAC addresses that a given network switch will find encapsulated in the header of frames that it receives. An important aspect of any hash function is the degree to which it uniformly distributes the values from the search key space in the hash key space. The hash key space is the set of all cache line indices generated from the hash function. If the search key space included all possible MAC addresses, then a simple bit select function would likely suffice because the values in the search key space would uniformly alias in the hash key space.

In practical application, however, the search key space has been demonstrated to contain more information in the low order 28 bits of each value than in the high order 20 bits. This property is developed in the paper "A Comparison of Hashing Schemes for Address Lookup in Computer Networks," Raj Jain, IEEE Transactions on Communication, Vol. 40, Number 3, October 1992. It is reasonable to expect some variation in this bit position information content among different network switches since the search key space may be different for each switch. However, the conclusion reached by Jain remains applicable. A desirable hash is one that uniformly distributes search keys in the hash space, permits storage of less than the full MAC address in each cache entry, and can be adapted to variations in the search key space.

BRIEF SUMMARY OF THE INVENTION

In accordance with the present invention, a cache line index for an address cache entry is calculated by organizing an address such as a Media Access Control ("MAC") address into a plurality of intermediate elements, manipulating the bits of at least one of the intermediate elements in accordance with predetermined criteria, and folding the intermediate elements together with an exclusive-OR function. The predetermined manipulation criteria may include programmable bitwise shifting and concatenation of intermediate elements with other address information such as a Virtual Local Area Network ("VLAN") index. In the case where a MAC address is employed, the 28 lower order bits of the MAC address are distributed across every bit of the exclusive-OR computation, thereby attributing greater "weight" to the bits that contain the greatest amount of information.

A 48 bit MAC address can be mapped to a 14 bit cache line index. In one of the disclosed embodiments, bits 13:0 of the MAC address are right shifted by a number of bits designated by a first variable using a barrel shifter and the result is employed as a first 14 bit intermediate element. Bits 27:14 of the MAC address are right shifted by a number of bits designated by a second variable using a barrel shifter and the result is employed as a second 14 bit intermediate element. Bits 47:46 of the MAC address are concatenated with bits 39:28 of the MAC address and the result is employed as a third 14 bit intermediate element. Bits 45:40 of the MAC address are concatenated with a logic value "0" and either the value "0000000" or the VLAN index, depending upon predetermined criteria, and the result is employed as the fourth 14 bit intermediate element. For example, the VLAN index may be employed only when the VLAN index field contains meaningful information. The four 14 bit intermediate elements are then entered into a bitwise exclusive-OR function, and the output may be employed as the cache line index.

A 7 bit VLAN index enables segmentation of the $2^{14}$ cache into 128 virtual tables, i.e., one table per index value, with dynamic size up to $2^{14}$ locations. The VLAN Index bits are distributed across 7 bits of the hash result if the VLAN index is employed in the hash calculation. Hence, the VLAN Index bits are "weighted" with respect to the upper MAC Address bits.

Calculations performed in accordance with the described technique are advantageously reversible. Because the cache line index is calculated through exclusive-OR folding of the do intermediate address elements, a subset of the intermediate address elements can be employed in conjunction with the cache line index to recover each element of the original address. In particular, any three of the intermediate elements can be employed in conjunction with the cache line index to recover the original MAC address. During an address cache search for an address specified in a data unit received by the switch, the address information in the header of the received data unit is employed as a search key into the address cache. If a match occurs then the original MAC address can be recovered by reversing the computations on the stored segments and the cache line index. Hence, the size of the tag portion that is maintained in the address cache entry is reduced relative to the full MAC address without a reduction in the information content of the entry.

Programmable bitwise shifting of intermediate address elements facilitates adaptation of the hash operation to different conditions. The variables that designate the number of bits by which the first and second elements are shifted can be dynamically adjusted to provide improved hash calculation results if the MAC address values being hashed produce uneven distribution. The two variably shifted 14 bit elements yield 196 distinct programmable variations for producing the hash result. Variable selection can be automated with software to provide more uniform distribution of the address information in the address cache.

BRIEF DESCRIPTION OF THE SEVERAL VIEWS OF THE DRAWING

The invention will be more fully understood in view of the following Detailed Description of the Invention, in conjunction with the Drawing, of which.

DETAILED DESCRIPTION OF THE INVENTION

Figure 1:
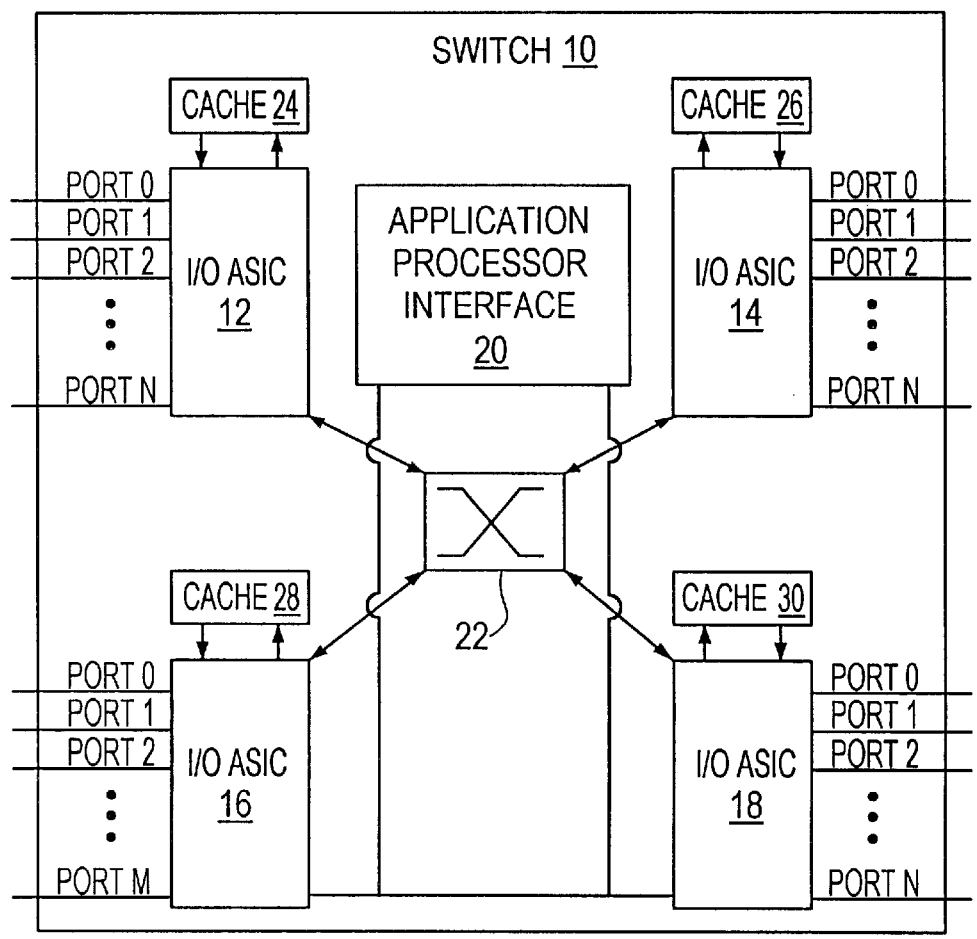
FIG. 1 is a block diagram of a network switch.

FIG. 1 illustrates a computer network switch 10 that facilitates the transfer of data units in a network. The switch 10 includes a plurality of Input/Output Application Specific Integrated Circuits ("I/O ASICs") 12, 14, 16, 18 that are in communication with an application processor 20 and a switch fabric 22 such as a crosspoint ASIC. Each I/O ASIC includes a plurality of ports that are connected with switches or other devices in the network. The ports are employed for receiving and transmitting data units. Different I/O ASICs may include different numbers of ports. For example, in the illustrated embodiment ASIC 16 includes m ports while ASICs 12, 14, 18 include n ports. Further, different I/O ASICs may support different transmission protocols and different data transmission rates. The switch includes a distributed address cache having a plurality of separate cache segments 24, 26, 28, 30, each of which is coupled with a different I/O ASIC. In the illustrated embodiment, cache 24 is coupled with I/O ASIC 12, cache 26 is coupled with I/O ASIC 14, cache 28 is coupled with I/O ASIC 16 and cache 30 is coupled with I/O ASIC 18.

Each cache segment 24, 26, 28, 30 of the address cache is employed to facilitate processing of data units in the switch 10. The entries in each cache segment indicate address information that may be employed to transmit data units to various devices such as switches, computers and printers that are coupled to the network. The address information is used to determine which port or ports in the switch should be employed for forwarding the data unit to a particular device or group of devices. When a data unit is received by the switch 10, the cache segment coupled to the receiving ASIC is searched to determine whether an entry in the cache segment is pertinent to the received data unit. In particular, the cache segment is searched for an entry with an address indicator field that corresponds to the destination address specified in the data unit header. If a pertinent entry is located in the address cache segment then a port index associated with that entry is employed to specify the port or ports to be used for data unit "forwarding." If a pertinent entry is not located in the cache segment then the switch 10 may "flood" the data unit by transmitting the data unit through every port in the switch except the port via which the data unit was received.

Figure 2:
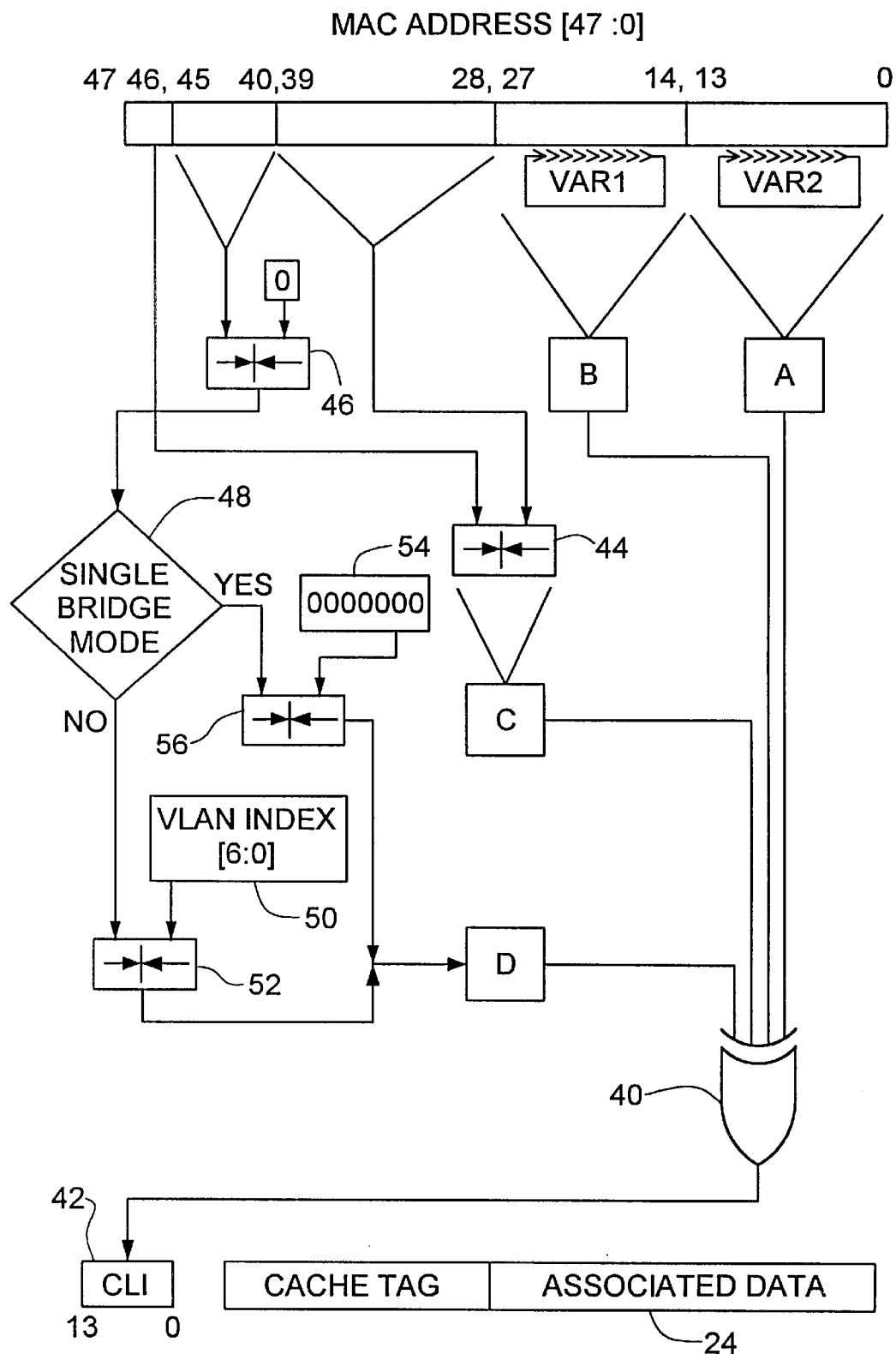
FIG. 2 is a flow diagram that illustrates entry generation for an address cache operation such as learning.

New address information may be "learned" from the data unit. Referring now to FIG. 2, address information can be learned from the data unit by employing the source address information specified in the data unit header. To generate a new address cache entry for a learn operation, the source address, which may be a Media Access Control ("MAC") source address [47:0] of the data unit, is combined with other values and organized into four 14 bit elements A, B, C, D. The elements are then provided to a bitwise exclusive-OR operator 40, and the output is employed as the cache line index 42. In the illustrated embodiment, bits [13:0] of the MAC address are right shifted by a number of bits designated by a first variable (VAR2) using a barrel shifter. The shifted MAC address [13:0] is employed as intermediate element "A." Bits [27:14] of the MAC address are right shifted by a number of bits designated by a second variable (VARL) using a barrel shifter. The shifted MAC address [27:14] is employed as intermediate element "B." Bits [47:46] of the MAC address are concatenated with bits [39:28] of the MAC address as indicated by concatenation operator 44, and the result is employed as intermediate element "C."

A 7 bit VLAN index enables segmentation of the $2^{14}$ address cache into as many as 128 virtual tables, i.e., one table per index value, each with dynamic size up to $2^{14}$ locations. The VLAN Index bits are distributed across 7 bits of the hash result if the VLAN index is employed in the hash calculation, thereby "weighting" the VLAN Index bits with respect to the upper MAC Address bits. The VLAN indices are orthogonal to the MAC address, i.e., the same MAC address may appear in a plurality of virtual tables. In the illustrated embodiment, bits [45:40] of the MAC address are concatenated with a logic value "0" as indicated by concatenation operator 46. The output from the concatenation operator 46 is concatenated with either the value "0000000" or the VLAN index, depending upon predetermined criteria determined by decision operator 48, to provide intermediate element "D." In particular, when the switch is operating in a "multi-bridge mode," where multiple virtual address tables are supported, then the VLAN Index from 50 is concatenated by concatenation operator 52 with the output from concatenation operator 46. If the switch is operating in "single-bridge mode," where only one address table is supported, the value "0000000" illustrated at 54 is concatenated by concatenation operator 56 with the output from concatenation operator 46.

Once computed, the four intermediate elements A, B, C, D are subjected to the bitwise exclusive-OR function 40, the result of which is employed as the cache line index 42. The illustrated hash computation may also be expressed as follows:

Element$_{13}$A=MAC$_{13}$Address[13:00]>>VAR2;

Element$_{13}$B=MAC$_{13}$Address[27:14]>>VAR1;

Element$_{13}$C=MAC$_{13}$Address[47:46]|MAC$_{13}$Address [39:28];

Element$_{13}$D=MAC$_{13}$Address[45:40]|"0"|(if Single$_{13}$Bridge$_{13}$Mode then "0000000": otherwise VLAN$_{13}$Index[6:0]);

CacheLineIndex=Element$_{13}$A XOR Element$_{13}$B XOR Element$_{13}$C XOR Element$_{13}$D;

Only three of the intermediate elements are included in the tag portion of the address cache entry. Because the cache line index 42 is calculated through exclusive-OR folding of the intermediate address elements A, B, C, D, a subset of the intermediate address elements can be employed in conjunction with the cache line index to recover the original address, i.e., the entry is "reversible." In the illustrated embodiment, intermediate elements A, B and D are included in the tag portion of the address cache entry. Because the size of the tag portion of the address cache entry is reduced relative to the full MAC address without a reduction in the information content of the entry, key searching on fewer than 48 bits of data may be performed. The cache tag can be expressed as follows: CacheTag [42:0]=MAC [45:40]|VLAN Index [6:0] |MAC [27:0]|Cache$_{13}$Line$_{13}$Index [13:12].

The cache tag is organized to make certain important aspects of the address visible without reverse hashing (recovering) the stored address from the cache tag. Specifically, the Group/Individual bit and Universal/Local bit and VLAN Index are visible. Each address cache tag includes the two most significant bits ("MSBs") of the cache line index associated with the entry. These bits are redundant with the cache line index when using a large cache size with $2^{14}$ cache lines. With smaller cache sizes, such as a cache having $2^{13}$ or $2^{12}$ cache lines, the cache line index MSBs may be employed to identify aliasing of cache lines.

During an address cache search for an address that is specified in the data unit received by the switch, the address information in the header of the received data unit may be organized into four elements and hashed as described above with regard to the learn operation. The cache line index provided by the operation would then be used to access the cache and retrieve the cache tag. The cache tag is compared against the MAC address and VLAN Index associated with the received data unit.

Figure 3:
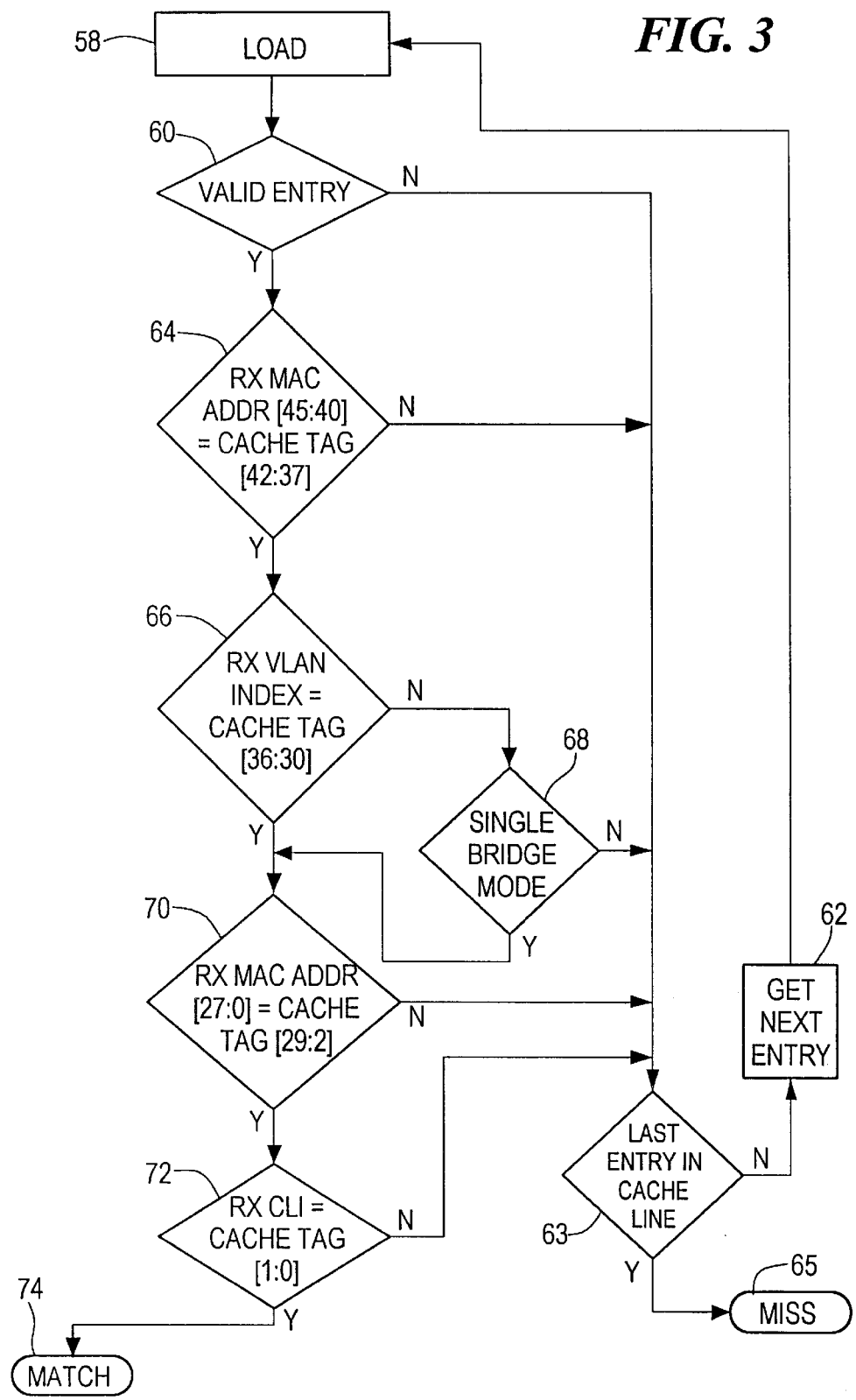
FIG. 3 is a flow diagram that illustrates an address cache search operation.

Referring to FIG. 3, in one embodiment the address cache search operation is performed by comparing a portion of the tag entries in the cache with selected fields from the received data unit. In the illustrated example, an address Ecache tag and the MAC address of the received data unit are loaded for processing as indicated by step 58. If the address cache entry is determined to be invalid, as determined in step 60, the next sequential address cache entry tag is loaded as indicated by step 62, unless the last entry in the cache has been reached as determined in step 63, in which case a miss is indicated as shown in step 65. If the address cache entry is determined to be valid at step 60, bits [45:40] of the data unit MAC address are compared with cache tag bits [42:37] as indicated by step 64. If the result is indicated to be unequal, the next cache entry is loaded as indicated by step 62, unless the last entry in the cache has been reached as determined in step 63, in which case a miss is indicated as shown in step 65. If the result is indicated to be equal, the VLAN index of the data unit is compared with cache tag bits [36:30] as indicated by step 66. If the result is indicated to be unequal, and the data unit header indicates single bridge mode as determined at step 68, flow continues to step 70. If the result at step 66 is indicated to be equal, then flow continues to step 70. Otherwise, if single bridge mode is not indicated as determined at step 68, the next cache entry is loaded as indicated by step 62, unless the last entry in the cache has been reached as determined in step 63, in which case a miss is indicated as shown in step 65. At step 70 MAC address bits [27:0] of the data unit are compared with cache tag bits [29:2]. If the result is indicated to be unequal, the next cache entry is loaded as indicated by step 62, unless the last entry in the cache has been reached as determined in step 63, in which case a miss is indicated as shown in step 65. If the result from step 70 is determined to be equal, the two most significant bits of the cache line index computed from the received data unit are compared with cache tag bits [1:0] as indicated by step 72. If the result is indicated to be unequal, the next cache entry is loaded as indicated by step 62, unless the last entry in the cache has been reached as determined in step 63, in which case a miss is indicated as shown in step 65. If the result from step 72 is indicated to be equal, a match is indicated as depicted in step 74. The illustrated search operation can also be expressed as follows:

(Cache Tag [42:0]=MAC [45:40]|VLAN Index [6:0] |MAC [27:0]|cache$_{13}$line$_{13}$index [13:12])

Cache Hit='1'when (
  entry$_{13}$valid=1 AND
  address[45:40]=tag[42:37] AND
  (VLAN$_{13}$Index=tag[36:30]  OR
  Single$_{13}$Bridge$_{13}$Mode=1) AND
  address[27:0]=tag[29:2] AND
  cache$_{13}$line$_{13}$index[13:12]=tag[1:0]
);

If the address cache entry is determined to be a match, the cache data is retrieved and used for data unit forwarding.

Figure 4:
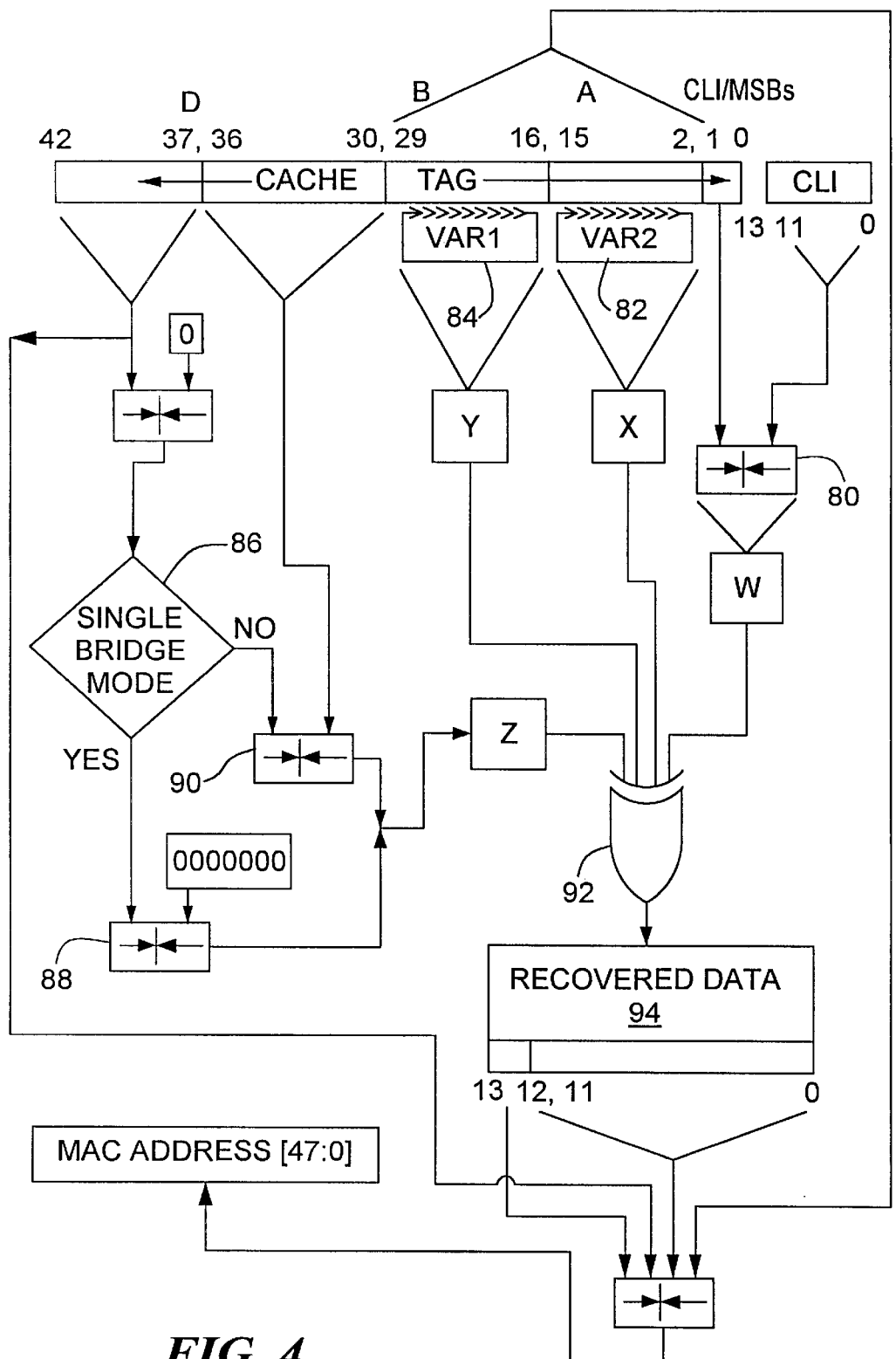
FIG. 4 is a flow diagram that illustrates an address cache recover operation.

Referring to FIG. 4, Data that is not stored can be recovered by reversing the hash calculation. The MAC address is recovered from the Address Cache by performing a reverse hash operation. An intermediate element W is provided by concatenating tag bits [1:0] with cache line index bits [11:0] with concatenation operator 80. An intermediate element X is provided by right shifting tag bits [15:2] by the number of bits specified in variable VAR2 as illustrated using shifter 82. An intermediate element Y is provided by right shifting tag bits [29:16] by the number of bits specified in variable VAR1 as illustrated using shifter 84. Tag bits [42:37] are concatenated with a value '0' and the result is modified based upon the mode associated with the entry. In particular, if single bridge mode is indicated by decision operator 86, the result is concatenated by concatenation operator 88 with '0000000' to provide intermediate element Z. If single bridge mode is not indicated by decision operator 86, the result is concatenated by concatenation operator 90 with tag bits [36:30] to provide intermediate element Z. Intermediate elements W, X, Y, Z are entered into a bitwise exclusive-OR function 92 to provide recovered data 94. The MAC address is recovered by concatenating recovered data bits [13:12] with tag bits [42:37], recovered data bits [11:0] and tag bits [29:2]. The illustrated reverse hash operation can also be expressed as follows:

Recovered Data=Tag Data[15:2]>>VAR2
  XOR Tag Data[29:16]>>VAR1
  XOR Tag Data[42:37]|0|(single$_{13}$bridge$_{13}$mode ?0: Tag Data[36:30])
  XOR Tag Data[1:0]|Cache Line Address[11:0]
MAC Address=Recovered Data[13:12]|Tag Data[42:37] |Recovered Data[11:0]|Tag Data[29:2]

Having described the preferred embodiments of the invention, other embodiments which incorporate concepts of the invention will now become apparent to those skilled in the art. Therefore, the invention should not be viewed as limited to the disclosed embodiments but rather should be viewed as limited only by the spirit and scope of the appended claims.

What is claimed is:

1. A method for calculating a cache line index into an address cache containing information used in the processing of network data units, comprising the steps of:
   organizing an address into a plurality of intermediate elements, wherein said organizing includes performing a bit wise shift on at least one portion of said address, and employing a result of said bit wise shift as at least one of said plurality of intermediate elements; and
   folding said intermediate elements together with an exclusive-OR function, wherein a result of said folding includes said cache line index, and where in the folding includes encompassing a predetermined one of the intermediate elements in the calculation of each bit of the cache line index, wherein the predetermined one of the intermediate elements includes bits more likely to differ in value between any two addresses than bits in other ones of the intermediate elements, wherein the encompassing of the predetermined one of the intermediate elements in the calculation of each bit of the cache line index provides more uniform distribution of cache line index values,
   wherein only a subset of the intermediate elements are stored in a tag portion of a cache entry.

2. The method of claim 1 wherein the address is a Media Access Control address and there are four intermediate elements, and including the step of storing three of the intermediate elements in a tag portion of the cache entry.

3. The method of claim 2 wherein the index is 14 bits in length, and including the step of encompassing at least some of the lower 28 bits of the address in the calculation of each bit of the cache line index in said folding step.

4. The method of claim 3 including the step of storing first and second most significant bits of the cache line index in the tag portion of the entry.

5. The method of claim 4 including the step of organizing the address cache into a plurality of virtual tables.

6. The method of claim 5 wherein the virtual tables are indexed by a virtual local area network index, and including the step of combining the virtual local area network index with a portion of the Media Access Control address to provide one of the intermediate elements prior to said step of folding the intermediate elements with the exclusive-OR function.

7. The method of claim 4 including the step of recalculating the Media Access Control address from the cache line index and the three stored intermediate elements.

8. The method of claim 7 including the step of encompassing the first and second most significant bits of the cache line index stored in the tag portion of the entry in the step of recalculating the Media Access Control address.

9. A method for generating a cache line index associated with an address cache entry in an address cache from a Media Access Control address and a virtual local area network index value, comprising the steps of:
   segmenting the Media Access Control address and virtual local area network index into a plurality of portions, said plurality of portions including a first portion, a second portion, a third portion and a fourth portion;
   shifting the first portion by a first predetermined number of bits in a first predetermined direction to form a first intermediate element;
   shifting the second portion by a second predetermined number of bits in a second direction to form a second intermediate element;
   employing said third portion as a third intermediate element;
   employing said fourth portion as a fourth intermediate element; and
   performing a bit wise exclusive-OR operation on the first intermediate element, second intermediate element, third intermediate element and fourth intermediate element to produce a result, wherein the result includes the cache line index, and wherein the performing includes encompassing a predetermined one of the intermediate elements in the calculation of each bit of the cache line index, wherein the predetermined one of the intermediate elements includes bits more likely to differ in value between any two addresses than bits in other ones of the intermediate elements, wherein the encompassing of the predetermined one of the intermediate elements in the calculation of each bit of the cache line index provides more uniform distribution of information in the address cache,
   wherein only a subset of the intermediate elements are stored in a tag portion of the cache entry.

10. The method of claim 9 including the step of storing three of the intermediate elements in a tag portion of the cache entry.

11. The method of claim 10 wherein the cache line index is 14 bits in length, and including the step of encompassing a different bit from each of the first element and second element in the calculation of each bit of a cache line index in said step of performing the bit wise exclusive-OR operation.

12. The method of claim 11 including the step of storing first and second most significant bits of the cache line index in a cache line index portion of a tag portion of the cache entry.

13. The method of claim 12 including the step of organizing the address cache into a plurality of virtual tables.

14. The method of claim 13 wherein the virtual tables are indexed by the virtual local area network index, and including the step of combining the virtual local area network index with a portion of the Media Access Control address to provide the fourth intermediate element prior to said step of performing said bit wise exclusive-OR operation.

15. The method of claim 12 including the step of recalculating the Media Access Control address from the tag portion of the cache entry.

16. The method of claim 15 including the step of encompassing the cache line index portion of the tag portion of the cache entry in the step of recalculating the Media Access Control address.

* * * * *

UNITED STATES PATENT AND TRADEMARK OFFICE
CERTIFICATE OF CORRECTION

PATENT NO. : 6,230,231 B1
DATED : May 8, 2001
INVENTOR(S) : Kenneth J. DeLong et al.

It is certified that error appears in the above-identified patent and that said Letters Patent is hereby corrected as shown below:

Column 2,
Line 61, "do intermediate" should read -- intermediate --;

Column 4,
Line 29, "(VARL)" should read -- (VAR1) --;
Line 64, "Element$_{13}$A=MAC$_{13}$Address [13:00]>>VAR2;" should read
-- Element_A=MAC_Address [13:00]>>VAR2; --;
Line 65, "Element $_{13}$B=MAC$_{13}$Address[27:14]>>VAR1;" should read
-- Element_B=MAC_Address [27:14]>>VAR1; --;
Line 66, "Element$_{13}$C=MAC$_{13}$Address[47:46] |MAC$_{13}$Address [39:28];" should read
-- Element_C=MAC_Address [47:46] |MAC_Address [39:28] --;

Column 5,
Lines 1-5, reads as follows:
"Element$_{13}$D=MAC$_{13}$Address [45:40] |"0"| (if Single$_{13}$Bridge$_{13}$Mode then "0000000":
otherwise VLAN$_{13}$Index [6:0] ) ;
CacheLineIndex=Element$_{13}$A XOR Element$_{13}$B XOR Element$_{13}$C XOR Element$_{13}$D;"
should read as follows:
-- Element_D=MAC_Address [45:40] |"0"| (if Single_Bridge_Mode then
"0000000" : otherwise VLAN_Index [6:0]) ;
CacheLineIndex=Element_A XOR Element_B XOR Element_C XOR Element_D --;
Line 20, "Cache$_{13}$Line$_{13}$Index [13:12]." should read -- Cache_Line_Index [13:12]. --;
Line 44, "Ecache" should read -- cache --;

Column 6,
Line 18, "|MAC[27:0]|cache$_{13}$line$_{13}$index[13:12])" should read -- | MAC[27:0] | cache_line_index[13:12] --;
Line 20, "entry$_{13}$valid=1 AND" should read -- entry_valid=1 AND --;
Line 22, "VLAN$_{13}$Index=tag[36:30] OR" should read -- VLAN_Index=tag[36:30] OR --;
Line 23, "Single$_{13}$Bridge$_{13}$Mode=1) AND" should read -- Single_Bridge_Mode=1) AND --;
Line 25, "cache$_{13}$line$_{13}$index[13:12] =tag[1:0]" should read -- cache_line_index[13:12] =tag [1:0] --;
Line 56, "XOR Tag Data [42:37] | 0 | (single$_{13}$bridge$_{13}$mode ?0: Tag" should read
-- XOR Tag Data [42:37] | 0 | (single_bridge_mode ?0: Tag --; and

UNITED STATES PATENT AND TRADEMARK OFFICE
CERTIFICATE OF CORRECTION

PATENT NO.    : 6,230,231 B1
DATED         : May 8, 2001
INVENTOR(S)   : Kenneth J. DeLong et al.

It is certified that error appears in the above-identified patent and that said Letters Patent is hereby corrected as shown below:

<u>Column 7,</u>
Line 12, "where in" should read -- wherein --.

Signed and Sealed this

Tenth Day of September, 2002

Attest:

JAMES E. ROGAN
Attesting Officer       Director of the United States Patent and Trademark Office